United States Patent
Hegde et al.

(10) Patent No.: US 9,338,760 B2
(45) Date of Patent: May 10, 2016

(54) METHOD AND SYSTEM FOR NOTIFYING A SYSTEM INFORMATION MODIFICATION

(71) Applicant: TEJAS NETWORKS LIMITED, Bangalore (IN)

(72) Inventors: Rohith Vijayakumar Hegde, Bangalore (IN); Vishwas Dubey, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 0 days.

(21) Appl. No.: 14/489,530

(22) Filed: Sep. 18, 2014

(65) Prior Publication Data

US 2015/0105109 A1    Apr. 16, 2015

(30) Foreign Application Priority Data

Sep. 20, 2013  (IN) .......................... 4255/CHE/2013

(51) Int. Cl.
*H04W 68/00*  (2009.01)
*H04W 48/08*  (2009.01)

(52) U.S. Cl.
CPC .............. *H04W 68/00* (2013.01); *H04W 48/08* (2013.01)

(58) Field of Classification Search
CPC ... H04W 68/00; H04W 68/02; H04W 68/025; H04W 52/02; H04W 68/12
See application file for complete search history.

(56) References Cited

U.S. PATENT DOCUMENTS

| | | | | |
|---|---|---|---|---|
| 2014/0206306 A1* | 7/2014 | Wu | ......................... | H04W 4/22 455/404.1 |
| 2014/0293901 A1* | 10/2014 | Hegde | ................... | H04W 68/02 370/329 |
| 2015/0038142 A1* | 2/2015 | Wang | ..................... | H04W 48/12 455/436 |
| 2015/0049609 A1* | 2/2015 | Park | ........................ | H04W 4/00 370/230 |
| 2015/0103650 A1* | 4/2015 | Koskinen | .............. | H04W 48/06 370/230 |

* cited by examiner

*Primary Examiner* — Ted Wang
(74) *Attorney, Agent, or Firm* — Barry Choobin; Patent 360 LLC

(57) ABSTRACT

The various embodiments of the present invention provide a method and system for notifying, a system information modification in at least one of a MIB/SIB1. The method comprises of transmitting a system information in a first modification period by an eNodeB, verifying the system information at eNodeB to check if the system information is to be modified in a modification period succeeding the first modification period, checking at eNodeB if only the system information corresponding to the at least one of the MIB or the SIB1 is modified, fetching the modified system information without initiating a paging procedure if only the MIB/SIB1 is modified and transmitting the modified system information in a succeeding modification period to the system information transmission module. The UE acquires the MIB/SIB1 at a start of each modification period.

3 Claims, 3 Drawing Sheets

METHOD AND SYSTEM FOR NOTIFYING A SYSTEM INFORMATION MODIFICATION

CROSS REFERENCE TO RELATED APPLICATIONS

This patent application claims the priority of the Indian Provisional Patent Application No 4255/CHE/2013 filed on Sep. 20, 2013, having the title "Method and System for Notifying a System Information Modification", and the content of which is incorporated herein by reference in its entirely.

BACKGROUND

1. Technical Field

The embodiments herein generally related to the field of radio communications and, particularly relates to detecting a change in system information in a cellular communication system. The present invention more particularly relates to a method and system for notifying change of system information of a MIB/SIB1.

2. Description of the Related Art

In a modern cellular communication system, e.g. a Long-Term Evolution of Universal Mobile Telecommunication System (UMTS LTE) specified within a 3rd Generation Partnership Project, system information is transmitted by a radio access network. The system information comprises information instructions for a terminal device (UE) to operate in a cell and/or in the radio access network. The radio access network may, however, change its operational parameters dynamically, which results in the change of the transmitted system information. The change in the system information and failures in detection of the changed system information in the UE may cause undesired effects in the radio access network.

Generally eNB transmits modified system information (SI) at specific radio frames i.e the modification period. The user equipment is notified/intimated about this SI modification via a paging procedure. The paging message is a penalty to the network especially if it is done to notify SI modifications only. Moreover, the UE is also not aware of what information has exactly changed and in which message. So the UE acquires all the required system information immediately from the next modification period. This is not an efficient paradigm.

Hence, there is a need for a method and system for notifying a change values of any information elements of MIB/SIB1 without triggering an SI change notification i.e. a Paging procedure.

The above mentioned shortcomings, disadvantages and problems are addressed herein and which will be understood by reading and studying the following specification.

OBJECTIVES OF THE EMBODIMENTS

The primary object of the embodiments herein is to provide a method and system for notifying a change in values of any information elements of MIB/SIB1 without triggering an SI change notification.

Another object of the embodiments herein is to provide a method and system for preventing transmission of paging messages for system information change notification.

Another object of the embodiments herein is to provide a method and system for eliminating the need of acquiring all the required SI messages.

Yet another object of the embodiments herein is to provide a method and system for increasing the efficiency of SI acquisition.

Yet another object of the embodiments herein is to provide a method and system to acquire the information elements in MIB/SIB1 at start of every modification period.

These and other objects and advantages of the embodiments herein will become readily apparent from the following detailed description taken in conjunction with the accompanying drawings.

SUMMARY

The various embodiments herein provide a method for notifying a system information modification in at least one of an Master Information Block (MIB) and System Information Block1 (SIB1). The method comprises of transmitting a system information in a first modification period by a system information transmission module in an eNodeB, verifying the system information to check if the system information is to be modified in a modification period succeeding the first modification period, checking if only the system information corresponding to the at least one of the MIB or the SIB1 is modified, fetching the modified system information without initiating a paging procedure if only the MIB/SIB1 is modified and transmitting the modified system information in a succeeding modification period to the system information transmission module.

According to one embodiment herein, the system information for at least one of the MIB and/or SIB1 is modified at a start of each modification period.

According to one embodiment herein, the method further comprises transmitting previously modified system information the succeeding modification period if there is no system information modification.

According to one embodiment herein, the UE acquires the MIB and SIB1 at a start of each of the modification period.

According to one embodiment herein further provide a system for notifying a system information modification of at least one of a MIB and SIB1 to one or more UEs. The system comprises of a system information transmission module adapted for transmitting a system information in a first modification period, a plurality of eNodeB (eNB's) adapted for notifying a system information modification corresponding to at least one of a Master Information Block (MIB) and a System information block 1 (SIB1) without triggering a paging procedure and one or more user equipments to acquire the MIB/SIB1 at start of each modification period.

According to one embodiment herein, the eNB is further adapted for verifying the system information to check if the system information is to be modified in a modification period succeeding the first modification period, checking if only the system information corresponding to the at least one of the MIB or the SIB1 is modified, fetching the modified system information without initiating a paging procedure if only the MIB/SIB1 is modified, and transmitting the modified system information in a succeeding modification period.

According to one embodiment herein, the eNB checks for system information modification for at least one of the MIB and SIB1 at a starting of each modification period.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
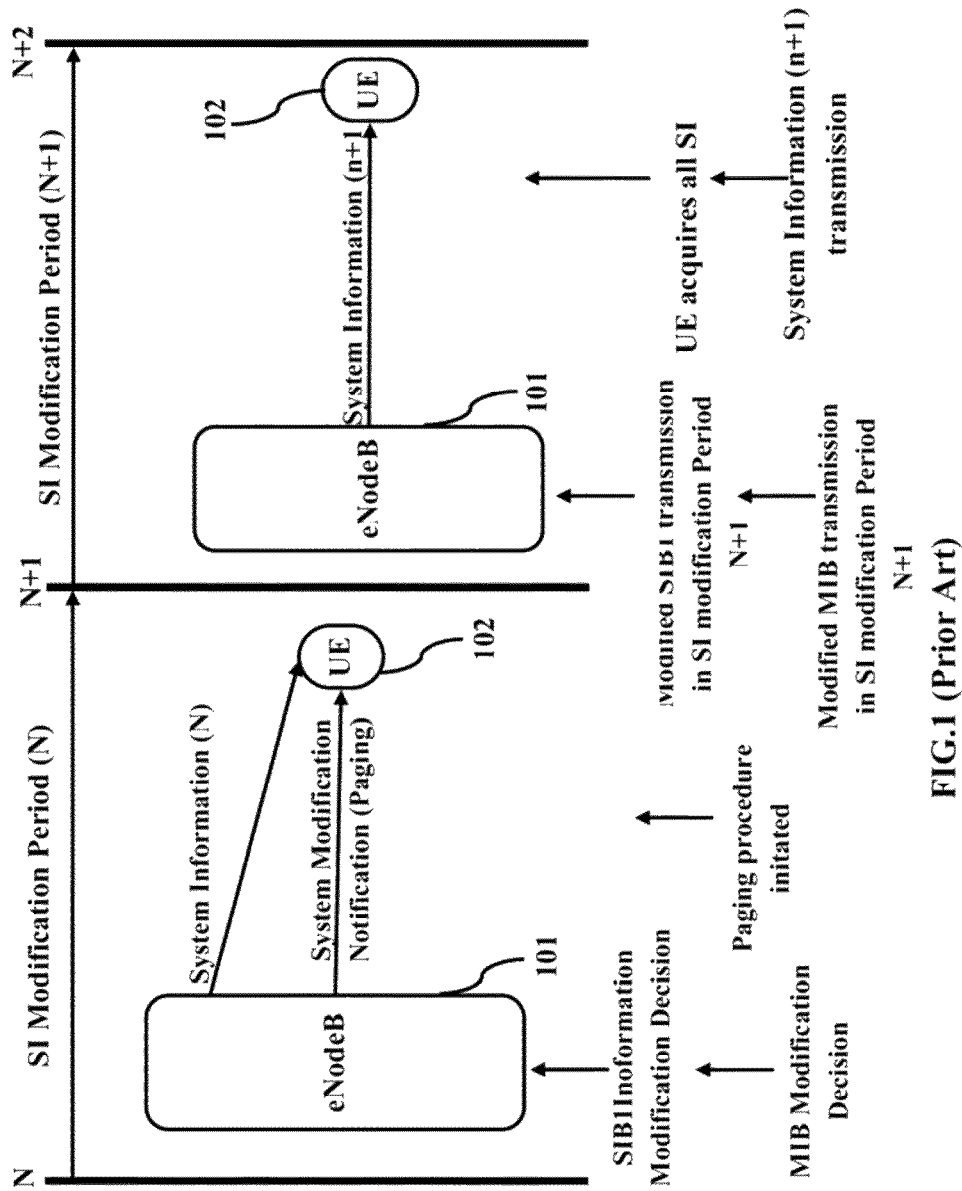
FIG. 1 is a prior art illustration of a method for notifying a system information modification in the MIB/SIB1, according to one embodiment herein.

FIG. 1 is a prior art illustration of a method for notifying a system information modification in the MIB/SIB1, according to one embodiment herein. When a System Information corresponding to at least one of MIB/SIB1 is to be modified, the eNodeB (eNB) 101 initiates the System Information notification procedure (Paging Procedure) in a current modification period (N). The eNB starts transmitting the modified System information from the start of the next modification period (N+1) to the User Equipments (UEs) 102. The UE 102 initiates System Information acquisition procedure to acquire all the required System Information. Thus SI Notification initiates the UEs 102 to acquire all the required System Information since the UE 102 does not know which SI has got modified. The UE then acquires MIB and SIB1 since it is a part of the required information during the modification period. Hence if the change in System Information is only a change in either of MIB and/or SIB1, the paging procedure is initiated (which is an overhead) and all the required system information are acquired (which is not necessary).

According to one embodiment herein, in the prior art illustration, all the UEs are paged in the current modification period (N). However, paging all the UEs is a penalty to the network especially if it is done to notify MIB and/or SIB1 modifications only.

Figure 2:
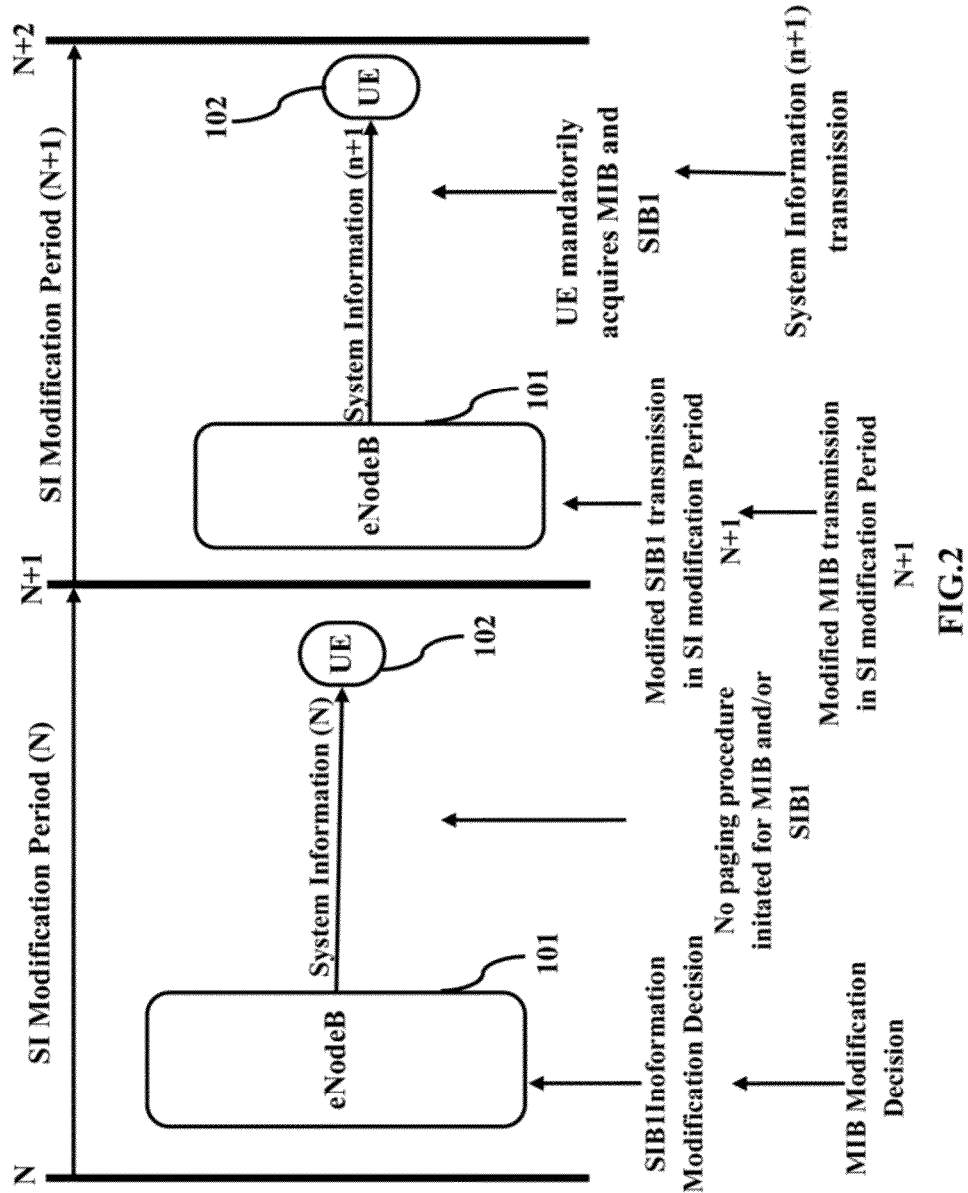
FIG. 2 is a flow diagram illustrating a process of notifying a system information modification in the MIB/SIB1 without initiating a paging procedure, according to one embodiment herein.

FIG. 2 is a flow diagram illustrating a process of notifying a system information modification in the MIB/SIB1 without initiating a paging procedure, according to one embodiment herein. During a change in the values of any information elements of a Master Information block (MIB) and/or System Information Block1 (SIB1), the NodeB (eNB) 101 does not initiate a paging procedure for system information modification in MIB and/or SIB1. Further the eNodeB transmits the modified MIB and SIB1 in the corresponding modification period i.e. N+1 to the UE 102. The eNB 101 modifies the MIB and/or SIB1 only at the start of a modification period. The UE 102 mandatorily acquires the modified system information corresponding to MIB/SIB1 immediately from the next SI modification period i.e. N+1. The UE 102 applies the SI values from the modification period in which SI was acquired.

Figure 3:
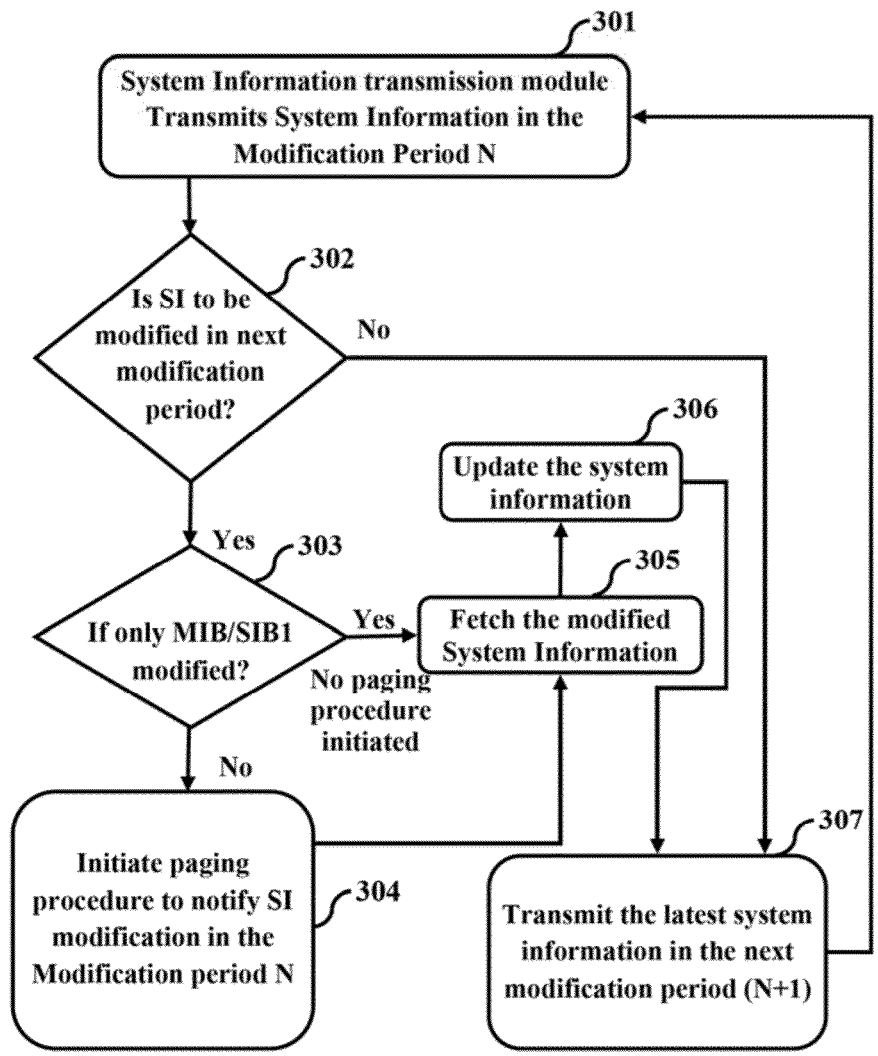
FIG. 3 is a flowchart illustrating a method for optimizing the System Information modification notification and SI acquisition procedure, according to one embodiment herein.

FIG. 3 is a flowchart illustrating a method for optimizing the System Information modification notification and SI acquisition procedure, according to one embodiment herein. The method herein optimizes the SI acquisition procedure by not initiating a Paging Procedure and mandating the UE to acquire MIB and/or SIB1 at the start of every modification period.

According to one embodiment herein, the system information transmission module within the eNB transmits system information in a first modification period (N) (301). The eNB checks if the system information is to be modified in the next modification period (N+1) (302). If there is no modification in the system information, then transmit the latest system information in the next modification period (N+1) (307). If the system information is to be modified, then check if only the system information corresponding to the MIB/SIB1 is modified (303). If system information messages other than MIB/SIB1 are modified in addition to the modification in MIB/SIB1, then eNB initiates paging procedure to notify SI modification in the modification period N (304). If only MIB/SIB1 is modified, then fetch the modified system information without initiating a paging procedure (305). Further update the modified system information in the next modification period (306) and transmit the modified system information in a succeeding modification period (307).

The embodiments herein mandate the UE to acquire MIB and/or SIB1 at the start of every modification period. The UE applies these values from the corresponding modification period The embodiments herein provide updated information regarding MIB and/or SIB1 on every modification period basis. This eliminates the need of acquiring all the required SI messages just for a change in the Information Elements (IEs) being broadcasted in MIB and/or SIB1.

The embodiments reduces the penalty on the network by eliminating the need of initiating paging messages for system information change notification in cases where only at least one of MIB and/or SIB1 is modified. Further the embodiments herein eliminate the need of acquiring all the required SI messages just for the change in the Information Elements (IEs) being broadcasted in MIB and/or SIB1, thereby optimizing the System Information acquisition procedure.

The embodiments herein eliminate the need for System Information change notification through a Paging procedure when System Information has got modified in MIB/SIB1 only at network resulting in efficient usage of radio resources.

Further the embodiment herein reduces the power consumption at the user equipment side by eliminating the processing need of SI change notification through paging message.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the to be submitted at the time of filing the complete specification.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for modifying a system information modification, the system comprises:
   a system information transmission module adapted for transmitting a system information in a first modification period;
   a plurality of eNodeBs adapted for notifying a system information modification corresponding to at least one of a Master Information Block (MIB) and a System Information Block 1 (SIB1) without triggering a paging procedure; and
   one or more user equipments to acquire the MIB and SIB1 at start of each of a modification period.

2. The system of claim 1, wherein the eNodeBs are further adapted for:
   verifying the system information to check if the system information is to be modified in a modification period succeeding the first modification period;
   checking if only the system information corresponding to the at least one of the MIB or the SIB 1 is modified;
   fetching the modified system information without initiating a paging procedure if only the MIB/SIB 1 is modified; and
   transmitting, the modified system information in a succeeding modification period to the system information transmission module.

3. The system of claim 1, wherein the eNodeB checks for system information modification for at least one of the MIB and SIB 1 at a starting of each modification period.

* * * * *